US007401464B2

(12) United States Patent
Yoshino

(10) Patent No.: US 7,401,464 B2
(45) Date of Patent: Jul. 22, 2008

(54) ENERGY REGENERATION SYSTEM FOR MACHINES

(75) Inventor: Kazunori Yoshino, Kobe (JP)

(73) Assignees: Caterpillar Inc., Peoria, IL (US); Shin Caterpillar Mitsubishi Ltd. (JP)

( * ) Notice: Subject to any disclaimer, the term of this patent is extended or adjusted under 35 U.S.C. 154(b) by 116 days.

(21) Appl. No.: 11/299,392

(22) Filed: Dec. 12, 2005

(65) Prior Publication Data

US 2006/0090461 A1 May 4, 2006

Related U.S. Application Data

(63) Continuation-in-part of application No. 10/714,171, filed on Nov. 14, 2003, now Pat. No. 7,197,871.

(51) Int. Cl.
*F16D 31/02* (2006.01)

(52) U.S. Cl. ........................................................ 60/414

(58) Field of Classification Search .................... 60/414
See application file for complete search history.

(56) References Cited

U.S. PATENT DOCUMENTS

| | | | | |
|---|---|---|---|---|
| 3,512,072 | A | 5/1970 | Karazija et al. | |
| 3,641,416 | A | 2/1972 | Riff | |
| 3,947,744 | A | 3/1976 | Grace | |
| 3,956,891 | A | 5/1976 | Karazija | |
| 4,702,076 | A | 10/1987 | Rosman | |
| 4,761,954 | A | 8/1988 | Rosman | |
| 4,961,316 | A | 10/1990 | Corke et al. | |
| 6,005,360 | A | 12/1999 | Pace | |
| 6,199,378 | B1 * | 3/2001 | Aardema et al. | 60/468 |
| 6,460,332 | B1 | 10/2002 | Maruta et al. | |
| 6,725,581 | B2 | 4/2004 | Naruse et al. | |

FOREIGN PATENT DOCUMENTS

| | | | |
|---|---|---|---|
| DE | 2618046 | | 11/1977 |
| DE | 2724383 | | 11/1978 |
| DE | 4324464 | A1 | 1/1995 |
| DE | 10128584 | A1 | 12/2002 |
| JP | 2002-195218 | | 10/2002 |

* cited by examiner

*Primary Examiner*—F. Daniel Lopez
(74) *Attorney, Agent, or Firm*—Liell & McNeil

(57) ABSTRACT

First and second displacement variable regenerating hydraulic motors are provided in third and fourth flow rate control lines which function as discharge flow paths for oil discharged, respectively, from first and second oil supply and discharge ports of a hydraulic motor, where controlling the displacement of the regenerating hydraulic motors allows the flow rate of discharge oil as well as the pressure of the third and fourth flow rate control lines to be controlled. First and second generators which generate electric power due to the rotation of the first and second regenerating hydraulic motors are further provided.

17 Claims, 3 Drawing Sheets

ENERGY REGENERATION SYSTEM FOR MACHINES

CROSS-REFERENCE TO RELATED APPLICATIONS

This application is a continuation-in-part of U.S. patent application Ser. No. 10/714,171, filed Nov. 14, 2003 now U.S Pat. No. 7,197,871.

TECHNICAL FIELD

The present invention relates to a technical field of an energy regeneration system for machines comprising a fluid pressure actuator, in which the energy of discharge fluid is regenerated.

BACKGROUND

In general, work machines such as a hydraulic excavator are provided with various kinds of fluid pressure actuators which are operated by pressurized fluid from pumps, and there has conventionally been known a technique for regenerating the energy of fluid discharged from the fluid pressure actuators such as a technique in which the pressure of fluid discharged from each fluid pressure actuator is recovered to be accumulated in an accumulator. However, accumulators result in problems in that they require a large capacity relative to the energy storage amount in comparison with other energy storage means such as batteries, and further that they have shorter storage times.

There is thus a need for improved techniques for regenerating and storing the energy of fluid discharged from a fluid pressure actuator as electrical energy.

Work machines such as a hydraulic excavator are generally arranged in such a manner that the flow rate of fluid discharged from a fluid pressure actuator is controlled by a control valve which performs meter-out control based on the amount of throttle. In one known example, the technique disclosed in Japanese Published Unexamined Patent Application No. 2002-195218 provides a turbine, which is driven rotationally by the inflow of discharge fluid, on the downstream side of such a control valve. Therefore, before the turbine is rotated to regenerate energy, the control valve removes the discharge fluid from the fluid pressure actuator, resulting in a temperature increase which thereby consumes energy, resulting in a problem of lower energy regeneration efficiency.

Further, although there is no consideration in Japanese Published Unexamined Patent Application No. 2002-195218 for the case that the fluid pressure actuator is a fluid pressure motor, various kinds of fluid pressure motors such as a hydraulic rotating motor for rotating an upper rotating body and/or a hydraulic traveling motor can be included in work machines such as a hydraulic excavator. Such fluid pressure motors generally include a control valve for flow rate control and a relief valve for preventing a pressure increase of a fluid supply flow path and/or a discharge flow path when starting or stopping the motor. The temperature of fluid passing through the relief valve can be increased to consume energy where there are demands that the energy of fluid passing through the relief valve could also be regenerated.

The present disclosure is aimed at solving this and other problems known to those skilled in the art.

SUMMARY OF THE DISCLOSURE

This technique provides a turbine, which is driven rotationally by the inflow of discharge fluid from a fluid pressure cylinder, in a discharge flow path wherein the driving force of the turbine allows a generator to generate electrical energy. Thus the energy of discharge fluid can be regenerated and stored efficiently as electrical energy, and further the electrical energy can be utilized as an alternative power source to an engine resulting in an environmentally-friendly technique.

In one aspect, the present disclosure provides an energy regeneration system for machinery. The system includes a fluid pressure actuator adapted to operated by supplying/discharging fluid. The system further includes a displacement variable regenerating fluid pressure motor in a discharge flow path for fluid discharged from the fluid pressure actuator such that controlling the displacement of the regenerating fluid pressure motor allows the flow rate of discharged fluid from the fluid pressure actuator as well as the pressure of the discharge flow path to be controlled. The system further includes an energy regeneration device for regenerating the energy of discharged fluid as electrical energy, at least in part by rotating the regenerating fluid pressure motor.

In another aspect, the present disclosure provides a machine including a hydraulic actuator having first and second supply/discharge ports, and a flow rate control circuit including first and second flow rate control lines connecting with said first and second supply/discharge ports, respectively. The machine further includes at least one displacement variable hydraulic motor within said flow rate control circuit, and at least one pressure sensing means disposed within said flow rate control circuit between said at least one displacement variable hydraulic motor and said hydraulic actuator. The machine further includes an energy regeneration device coupled with the displacement variable hydraulic motor for regenerating at least a portion of an energy of discharged fluid of said hydraulic actuator as electrical energy.

In still another aspect, the present disclosure provides a method of operating a hydraulic energy recovery system.

DETAILED DESCRIPTION

Figure 1:
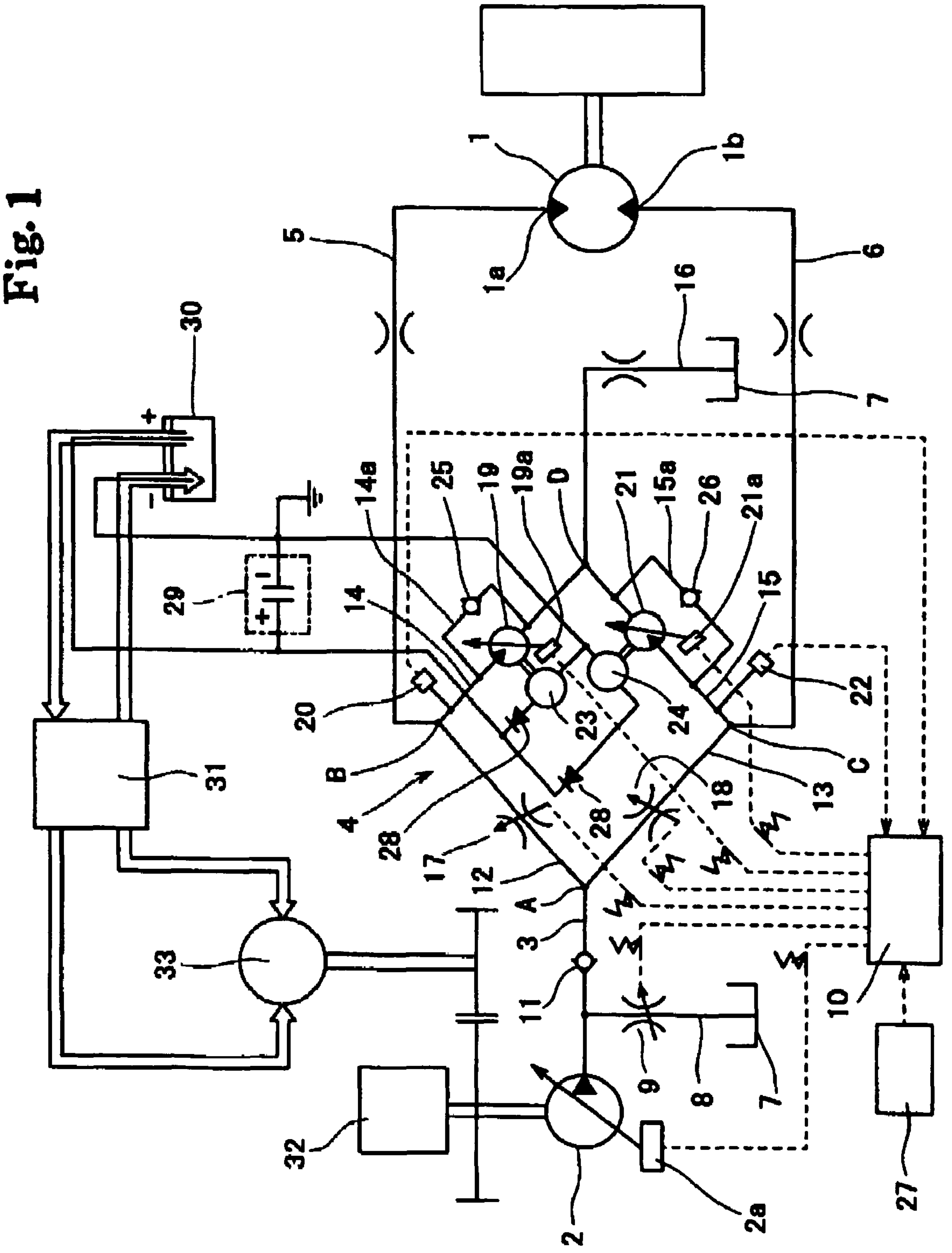
FIG. 1 is a view of an energy regeneration system according to a first embodiment of the present disclosure.

In FIG. 1, a hydraulic motor 1 is provided in a work machine such as a hydraulic excavator (e.g. a hydraulic rotating motor for rotating an upper rotating body of a hydraulic excavator), the hydraulic motor 1 being a bi-directional rotary type having first and second oil supply and discharge ports 1*a*, 1*b*, and being arranged in such a manner as to rotate in one direction when supplying pressure oil to the first oil supply and discharge port 1*a* and discharging oil from the second oil supply and discharge port 1*b*, and rotating in the opposite direction when supplying pressure oil to the second oil supply and discharge port 1*b* and discharging oil from the first oil supply and discharge port 1*a*.

The hydraulic motor 1 includes a hydraulic pump 2 as a pressure oil supply source to the hydraulic motor 1. The hydraulic pump 2 is adapted in such a manner as to be driven using an engine 32 mounted on the working machinery as a main power source and a motor 33 to be described later as an auxiliary power source, wherein a hydraulic circuit between the hydraulic pump 2 and the hydraulic motor 1 are provided which include: a discharge line 3 connected to the discharge side of the hydraulic pump 2; a flow rate control circuit 4 connected to the downstream side of the discharge line 3; a first motor side line 5 adapted to connect the flow rate control circuit 4 and the first oil supply and discharge port 1*a* of the hydraulic motor 1; and a second motor side line 6 adapted to connect the flow rate control circuit 4 and the second oil supply and discharge port 1*b* of the hydraulic motor 1.

In the intermediate part of the discharge line 3 is formed a return line 8 to an oil tank 7 in a branching manner. In the return line 8 is disposed a by-pass valve 9 arranged in such a manner as to operate based at least in part on a command from a controller 10 to be described later. Further, in the discharge line 3 is disposed a check valve 11 on the downstream side of the bifurcation point for the return line 8, the check valve 11 preventing the counter flow of oil into the hydraulic pump 2 and the return line 8.

The flow rate control circuit 4 is formed by connecting first, second, third and fourth flow rate control lines 12, 13, 14, 15 in what is commonly referred to as a wheatstone bridge fluid configuration that may be shown schematically in the FIGS. as a rectangular annular shape as follows. The discharge line 3 is connected to a connecting part A between the first flow rate control lines 12 and second flow rate control lines 13. The first motor side line 5 is connected to a connecting part B between the first flow rate control lines 12 and third flow rate control lines 14. The second motor side line is connected to a connecting part C between the second flow rate control lines 13 and fourth flow rate control lines 15. Finally, a discharge line 16 reaching the oil tank 7 is connected to a connecting part D between the third flow rate control lines 14 and fourth flow rate control lines 15.

In the first flow rate control line 12 is disposed a first meter-in valve 17 adapted to control the flow rate of supply oil from the discharge line 3 to the first motor side line 5. In the second flow rate control line 13 is disposed a second meter-in valve 18 adapted to control the flow rate of supply oil from the discharge line 3 to the second motor side line 6. The first and second meter-in valves 17, 18 are operably controlled by the controller 10.

Also, in the third flow rate control line 14 is disposed a displacement variable first regenerating hydraulic motor 19. The displacement of the first regenerating hydraulic motor 19 varies from zero to a predetermined maximum value based on a control command output from the controller 10 to a displacement control means 19*a*, which allows the flow rate in the third flow rate control line 14 to vary from zero to a predetermined maximum value. The displacement change of the first regenerating hydraulic motor 19 then allows the flow rate control (meter-out control) of discharge oil from the first motor side line 5 to the discharge line 16 and the pressure control of the first motor side line 5. Further, in the third flow rate control line 14 is disposed a first pressure sensor 20 for detecting the pressure of the third flow rate control line 14 on the upstream side of the first regenerating hydraulic motor 19, the first pressure sensor 20 being disposed to output a detection signal to the controller 10.

In the fourth flow rate control line 15 are disposed a second regenerating hydraulic motor 21 and a second pressure sensor 22 similar to the first regenerating hydraulic motor 19 and the first pressure sensor 20 disposed in the third flow rate control line 14. Then, the displacement change of the second regenerating hydraulic motor 21, based on a control command output from the controller 10 to a displacement control means 21*a* of the second regenerating hydraulic motor 21, allows the flow rate control (meter-out control) of discharge oil from the second motor side line 6 to the discharge line 6 and the pressure control of the second motor side line 6.

First and second generators 23 and 24 are interlockingly connected, respectively, to the first and second regenerating hydraulic motors 19 and 21. The first and second generators 23 and 24 can be driven by the torque of the first and second regenerating hydraulic motors 19 and 21 to generate electric power.

The third and fourth flow rate control lines 14 and 15 also include by-pass lines 14*a* and 15*a* for by-passing, respectively, the first and second regenerating hydraulic motors 19 and 21. In the by-pass lines 14*a* and 15*a* are disposed, respectively, check valves 25 and 26 disposed to allow oil flow from the discharge line 16 to the first motor side line 5 and the second motor side line 6, but to prevent oil flow in the opposite direction. Thus, oil replenishment from the oil tank 7 is to be made when the first motor side line 5 or the second motor side line 6 becomes a vacuum state.

The controller 10, which is composed of a microcomputer, etc. receives a command signal output from a control lever 27 for the hydraulic motor 1 and detection signals output from the first and second pressure sensors 20 and 22, and then outputs control commands to a displacement control means 2*a* of the hydraulic pump 2, the by-pass valve 9, the first and second meter-in valves 17 and 18, the displacement control means 19*a* and 21*a* of the first and second regenerating hydraulic motors 19 and 21, etc., based on the input signals.

In respect to control commands output from the controller 10, when the control lever 27 for the hydraulic motor 1 is positioned in the stop position (i.e. no operation is performed on the control lever 27), the controller 10 outputs a control command of "Valve Open" to the by-pass valve 9, while outputting "Valve Closed" to the first and second meter-in valves 17 and 18, and further outputs control commands of "Displacement Zero" to the displacement control means 19*a* and 21*a* of the first and second regenerating hydraulic motors 19 and 21. Thus, oil forcibly sent from the hydraulic pump 2 is to be returned to the oil tank 7 through the return line 8, and since the first to fourth flow rate control lines 12 to 15 are in a closed state, no oil is supplied or discharged to or from the hydraulic motor 1, and therefore the hydraulic motor 1 is stopped.

On the other hand, when the control lever 27 is in the position that indicates rotation of the hydraulic motor 1 in one direction, the controller 10 outputs a control command of "Valve Close" to the by-pass valve 9, while outputting a control command of "Valve Open" to the first meter-in valve 17, and a control command of "Valve Close" to the second meter-in valve 18. In this case, the amount of opening of the first meter-in valve 17 is controlled in such a manner as to increase or decrease in accordance with the increase or decrease of the operation amount of the control lever 27. Also, the controller 10 outputs a control command of "Displacement Zero" to the displacement control means 19*a* of the first regenerating hydraulic motor 19 if the pressure P1 of the third flow rate control line 14 detected by the first pressure sensor 20 is equal to or smaller than a predetermined relief pressure PS, while outputting a control command to be a predetermined relief displacement if the pressure P1 is larger than the predetermined relief pressure PS. Further, the controller 10 outputs a control command to the displacement control means 21*a* of the second regenerating hydraulic motor 21 so that the displacement is increased or decreased in accordance with the increase or decrease of the operation amount of the control lever 27 if the pressure P2 of the fourth flow rate control line 15 detected by the second pressure sensor 22 is equal to or smaller than the predetermined relief pressure, and outputs a control command to be the relief displacement if the pressure P2 is larger than the predetermined relief pressure PS. In this case, if the displacement of the second regenerating hydraulic motor 21 corresponding to the operation amount of the control lever 27 is larger than the relief displacement, the motor is controlled to be a displacement corresponding to the operation amount of the control lever 27 regardless of the pressure of the fourth flow rate control line 15.

Therefore, oil forcibly sent from the hydraulic pump 2 flows through the discharge line 3 to the first flow rate control line 12, and then the flow rate of the oil is controlled by the first meter-in valve 17 disposed in the first flow rate control line 12 to be supplied to the first oil supply and discharge port 1*a* of the hydraulic motor 1 through the first motor side line 5. On the other hand, discharge oil from the second oil supply and discharge port 1*b* flows through the second motor side line 6 to the fourth flow rate control line 15, and then the flow rate is controlled by the second regenerating hydraulic motor 21 disposed in the fourth flow rate control line 15 to flow into the oil tank 7 through the discharge line 16, whereby the hydraulic motor 1 rotates in one direction. Further, in the rotation of the hydraulic motor 1 in one direction, due at least in part to the rotation of the second regenerating hydraulic motor 21 which controls the flow rate in the discharge flow path from the hydraulic motor 1, the second generator 24 is driven to generate electric power.

Meanwhile, when turning the control lever 27 back to the stop position to stop the hydraulic motor 1 operated in the foregoing rotational state in one direction, the displacement of the second regenerating hydraulic motor 21 is controlled to be zero, based on an operation command from the control lever 27, to turn the fourth flow rate control line 15 into a closed state, where the hydraulic motor 1 cannot be stopped immediately due to the application of inertial load still rotating, and oil discharged from the thus rotating hydraulic motor 1 flows through the second motor side line 6 to the fourth flow rate control line 15 to increase the pressure of the fourth flow rate control line 15. The pressure P2 of the fourth flow rate control line 15 is detected by the second pressure sensor 22, and when the pressure P2 of the fourth flow rate control line 15 becomes equal to or larger than the predetermined relief pressure PS, the controller 10 outputs a control command to the second regenerating hydraulic motor 21 to be the relief displacement, as mentioned above. Thus, the fourth flow rate control line 15 is in a state of oil passage where the second regenerating hydraulic motor 21 has a rotational resistance to the extent of keeping the predetermined relief pressure PS, and then allows discharge oil to flow from the hydraulic motor 1 to the oil tank 7. Thus, the second regenerating hydraulic motor 21 performs relief control when stopping the motor, and also in such a case of being operated for relief control, the second generator 24 is driven by the rotation of the second regenerating hydraulic motor 21 to generate electric power.

Also, in the rotation of the hydraulic motor 1 in one direction, the first flow rate control line 12 and the first motor side line 5 function as a pressure oil supply flow path to the hydraulic motor 1, where the third flow rate control line 14 reaching the oil tank 7 via the discharge line 16 is connected to the connecting part B disposed in the intermediate part of the pressure oil supply flow path. For example, in the rotation of the hydraulic motor 1 in one direction, the third flow rate control line 14 corresponds to the relief flow path connected to the pressure oil supply flow path.

Meanwhile, when the hydraulic motor 1 is going from a stopped state into a rotational state, the pressure of the pressure oil supply flow path to the hydraulic motor 1 is increased due to a time lag in motor starting by the inertial load applied to the hydraulic motor 1. The increased pressure flows through the connecting part B to the third flow rate control line 14 to be detected by the first pressure sensor 20. In this case, when the pressure P1 of the third flow rate control line 14 becomes larger than the predetermined relief pressure PS, the displacement of the first regenerating hydraulic motor 19 is controlled to be the relief displacement based on a command from the controller 10 as mentioned above, whereby pressure oil in the pressure oil supply flow path is relieved to the oil tank 7 through the third flow rate control line 14 and the discharge line 16. Thus, the first regenerating hydraulic motor 19 may perform relief control when starting the motor, and the first generator 23 may be driven by the rotation of the first regenerating hydraulic motor 19, which is thus operated for relief control, to generate electric power.

On the other hand, when the control lever 27 is operated to be in the position that indicates the rotation of the hydraulic motor 1 in the opposite direction, the controller 10 outputs a control command of "Valve Close" to the by-pass valve 9, and a control command of "Valve Close" to the first meter-in valve 17, while outputting a control command of "Valve Open" to the second meter-in valve 18. In this case, the amount of opening of the second meter-in valve 18 is controlled in such a manner as to increase or decrease in accordance with the increase or decrease of the operation amount of the control lever 27. Also, the controller 10 outputs a control command to the displacement control means 19*a* of the first regenerating hydraulic motor 19 so that the displacement is increased or decreased in accordance with the increase or decrease of the operation amount of the control lever 27 if the pressure P1 of the third flow rate control line 14 is detected by the first pressure sensor 20 is equal to or smaller than the predetermined relief pressure PS, while outputting a control command to be the relief displacement if the pressure P1 is larger than the predetermined relief pressure PS. In this case, if the displacement of the first regenerating hydraulic motor 19 corresponding to the operation amount of the control lever 27 is larger than the relief displacement, the motor is controlled to be a displacement corresponding to the operation amount of the control lever 27 regardless of the pressure of the third flow rate control line 14. Further, the controller 10 outputs a control command of "Displacement Zero" to the displacement control means 21*a* of the second regenerating hydraulic motor 21 if the pressure P2 of the fourth flow rate control line 15 detected by the second pressure sensor 22 is equal to or smaller than the predetermined relief pressure PS, while outputting a control command to be the relief displacement if the pressure P2 is larger than the predetermined relief pressure PS. Therefore, oil forcibly sent from the hydraulic pump 2 flows through the discharge line 3 to the second flow rate control line 13, and then the flow rate of the oil is controlled by the second meter-in valve 18 disposed in the second flow rate control line 13 to be supplied to the second oil supply and discharge port 1*b* of the hydraulic motor 1 through the second motor side line 6. On the other hand, discharge oil from the first oil supply and discharge port 1*a* at one side flows through the first motor side line 5 to the third flow rate control line 14, and then the flow rate of the oil is controlled by the first regenerating hydraulic motor 19 disposed in the third flow rate control line 14 to flow into the oil tank 7 through the discharge line 16, whereby the hydraulic motor 1 rotates in the opposite direction. Further, in the rotation of the hydraulic motor 1 in the opposite direction, due to the rotation of the first regenerating hydraulic motor 19 which controls the flow rate in the discharge flow path from the hydraulic motor 1, the first generator 23 is driven to generate electric power.

When stopping the opposite rotation of the hydraulic motor 1, the first regenerating hydraulic motor 19 disposed in the discharge flow path performs relief control, and the first generator 23 is driven by the rotation of the first regenerating hydraulic motor 19, which is thus operated for relief control, to generate electric power, as is the case with the rotation in one direction as mentioned above. Also, when starting the opposite rotation of the hydraulic motor 1, the fourth flow rate control line 15 functions as a relief flow path connected to the pressure oil supply flow path, where the second regenerating hydraulic motor 21 disposed in the relief flow path performs relief control, and the second generator 24 is driven by the rotation of the second regenerating hydraulic motor 21, which is thus operated for relief control, to generate electric power.

As mentioned above, when rotating, starting and stopping the hydraulic motor 1, the first and second generators 23 and 24 are driven by the rotation of the first and second regenerating hydraulic motors 19 and 21 to generate electric power, and the electric power is rectified by a diode 28 to be stored in a capacitor 29 and a storage battery 30. Then, the electric power stored in the capacitor 29 and the storage battery 30 is supplied to the motor 33, which functions as an auxiliary power source for the hydraulic pump 2, via an inverter 31 for converting DC power into AC power and for controlling the voltage.

INDUSTRIAL APPLICABILITY

In the embodiment as arranged above, when rotating the hydraulic motor 1, pressure oil is to be supplied to the one oil supply and discharge port 1*a* (or the other oil supply and discharge port 1*b*) while oil is to be discharged from the other oil supply and discharge port 1*b* (or the one oil supply and discharge port 1*a*), and the discharge oil from the second oil supply and discharge port 1*b* (or the one oil supply and discharge port 1*a*) flows through the second motor side line 6 (of the first motor side line 5) to the fourth flow rate control line 15 (or the third flow rate control line 14), and then the flow rate of the oil is controlled (meter-out control) by the displacement variable second regenerating hydraulic motor 21 (or the first regenerating hydraulic motor 19) disposed in the fourth flow rate control line 15 (or the third flow rate control line 14) to flow into the oil tank 7 through the discharge line 16 as mentioned above. The second generator 24 (or the first generator 23) is to be driven by the rotation of the second regenerating hydraulic motor 21 (or the first regenerating hydraulic motor 19) to generate electric power.

Also, as mentioned above, when starting or stopping the hydraulic motor 1, the first and second regenerating hydraulic motors 19 and 21 perform pressure control (relief control) in which the pressure increase in the pressure oil supply flow path or the oil discharge flow path is prevented by directing the oil in the flow paths to the oil tank 7 when the pressure of the supply flow path or the discharge flow path becomes equal to or larger than the predetermined relief pressure, where the first and second generators 23 and 24 are driven also by the rotation of the first and second regenerating hydraulic motors 19 and 21, due to the pressure control, to generate electric power. The electric power generated by the driving of the first and second generators 23 and 24 is stored in the capacitor 29 and the storage battery 30, and the stored electric power may be supplied to the motor 33 which functions as an auxiliary power source for the hydraulic pump.

As described above, in the present embodiment, the first and second regenerating hydraulic motors 19 and 21 are rotated by the inflow of discharge oil from the hydraulic motor 1 when rotated or discharge oil is relieved when starting or stopping the motor, and the first and second generators 23 and 24 generate electric power by the rotational driving of the first and second regenerating hydraulic motors 19 and 21. In this way the energy of the discharge oil can be regenerated as electrical energy, where the first and second regenerating hydraulic motors 19 and 21 not only drive the first and second generators 23 and 24, but also perform flow rate control of the discharge oil from the hydraulic motor 1 as well as pressure control (relief control) of the pressure oil supply flow path and the oil discharge flow path.

Accordingly, it becomes unnecessary to provide a flow rate control valve or a relief valve for discharge oil from the hydraulic motor 1, resulting in no energy loss when passing through the flow rate control valve or the relief valve. Thus the energy of discharge oil can be regenerated at a high efficiency as electrical energy, which allows an improvement in energy regeneration efficiency to be achieved. Using the regenerated electrical energy as a power source for the motor 33, which functions as an auxiliary power source for driving the hydraulic pump 2, allows fossil fuel consumed by the engine 32 to be reduced which can make a contribution to energy savings and is also environmentally preferable.

Additionally, requiring no flow rate control valve or relief valve for discharge oil can make a contribution to the reduction in the number of parts. Because the circuit is arranged in such a manner that the relief flow path connected to the pressure oil supply flow path to the one oil supply and discharge port 1*a* (or the other oil supply and discharge port 1*b*) of the hydraulic motor 1 functions as a discharge flow path from the one oil supply and discharge port 1*a* (or the other oil supply and discharge port 1*b*), the first regenerating hydraulic motor 19 (or the second regenerating hydraulic motor 21), which controls the pressure of the pressure oil supply flow path when starting the rotation of the hydraulic motor 1 in one direction (or in the opposite direction), performs discharge flow rate control when rotating the motor in the opposite direction (or in one direction) as well as pressure control for the discharge flow path when stopping the rotation in the opposite direction (or in one direction). Thus it is not necessary to provide separate regenerating fluid pressure motors, respectively, for the relief flow path and the discharge flow path, resulting in a reduction in the number of regenerating hydraulic motors and generators to be connected thereto, which can make a contribution to cost reductions and space savings.

Figure 2:
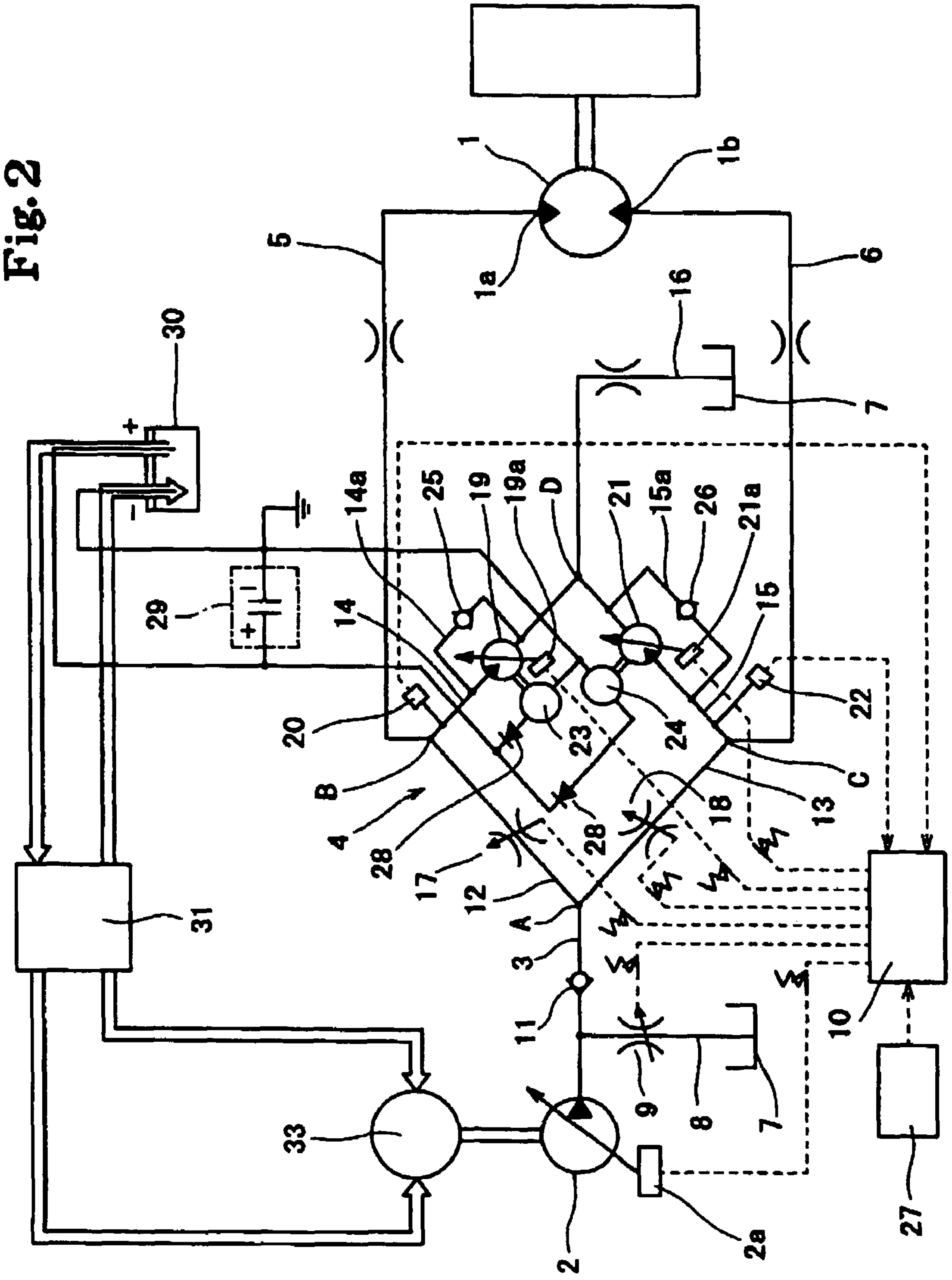
FIG. 2 is a view of an energy regeneration system according to the second embodiment of the present disclosure wherein like elements have like numbers to FIG. 1.
Figure 3:
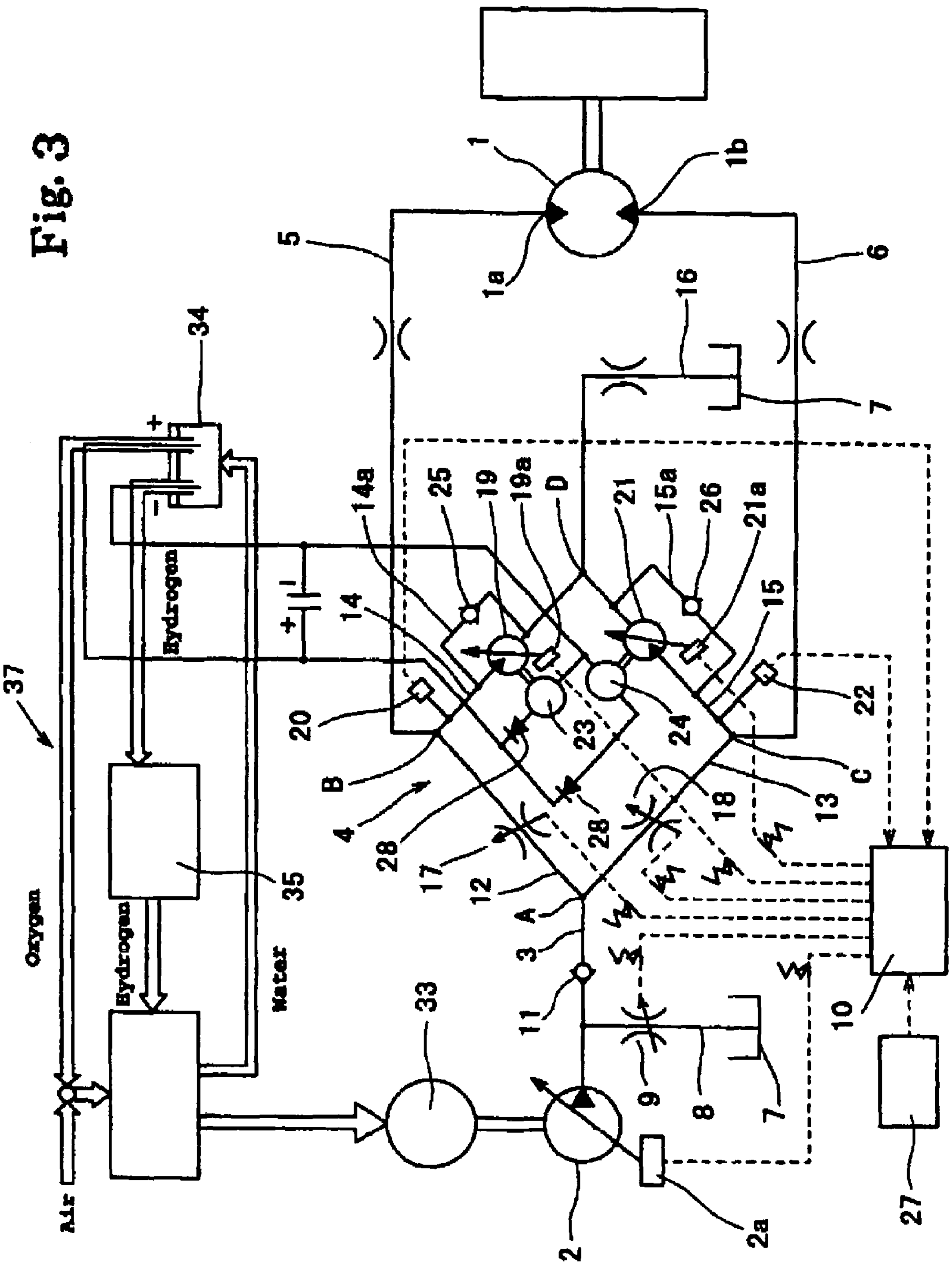
FIG. 3 is a view of an energy regeneration system according to a third embodiment of the present disclosure wherein like elements have like numbers to FIGS. 1 and 2.

It will then be recognized that the present invention is not restricted to the above-described embodiment, but can be arranged in such a manner as the second embodiment shown in FIG. 2 that the hydraulic pump 2 is driven only by the motor 33 without using an engine if the motor 33 suffices as a power source for driving the hydraulic pump 2. Also, a device for storing electric power generated by the generators 23 and 24 is not restricted to the capacitor 29 or the storage battery 30, but can be arranged in such a manner as the third embodiment shown in FIG. 3. This embodiment is an example which includes a fuel cell device 37 composed of an electrolytic cell 34 for electrolyzing water using electric power generated by the generators 23 and 24 to generate hydrogen and oxygen, a hydrogen storage device 35 including hydrogen storing alloy for absorbing hydrogen generated in the electrolytic cell 34, a fuel cell 36 for generating an electric power using hydrogen and oxygen as fuel, etc., and to drive the motor 33 using electric power supplied from the fuel cell device 37. It is noted that in the second and third embodiments, components common to (identical with) those described in the first embodiment are designated by the same reference numerals so as to omit the description thereof.

Further, the above embodiments, although exemplifying hydraulic motors as fluid pressure actuators, may be applied to a hydraulic cylinder, and further applied widely to pressurized fluid of not only hydraulic but also pneumatic fields.

Finally, it will be appreciated that the above embodiments, although utilizing electrical energy obtained by regenerating the energy of discharge fluid from the fluid pressure actuators as a power supply source for motors for driving pumps adapted to supply pressurized fluid to the fluid pressure actuators, are not restricted thereto but can be used for various kinds of electric machinery to be mounted on work machines as a matter of course. These and other advantages or aspects of the above described disclosure will be known to one skilled in the art based upon the included claims, Figures, and descriptions.

What is claimed is:

1. An energy regeneration system for machinery comprising:

a fluid pressure actuator adapted to operate by being supplied or discharging fluid;

a first displacement variable regenerating fluid pressure motor in a discharge flow path for fluid discharged from the fluid pressure actuator such that controlling the displacement of the first regenerating fluid pressure motor allows the flow rate of discharge fluid from the fluid pressure actuator as well as the pressure of the discharge flow path to be controlled;

first energy regeneration device for regenerating the energy of discharge fluid as electrical energy, at least in part by rotating the first regenerating fluid pressure motor;

the displacement of the first regenerating fluid pressure motor is controlled so that the flow rate of discharge fluid from the fluid pressure actuator varies from zero to a predetermined maximum value a relief flow path connected to a supply flow path for fluid to be supplied to the fluid pressure actuator between an intermediate part of the supply flow path and a fluid tank;

a second displacement variable regenerating fluid pressure motor in the relief flow path such that controlling the displacement of the second regenerating fluid pressure motor allows the pressure of the supply flow path to the fluid pressure actuator to be controlled; and a second regeneration device for regenerating the rotational energy of fluid in the relief flow path as electrical energy, at least in part by rotating the second regenerating fluid pressure motor.

2. The energy regeneration system for machinery according to claim 1, including:

a pressure sensor in the supply path;

a controller in communication with the pressure sensor, and being operable to generate a pressure relief control command responsive to a sensed pressure in excess of a predetermined relief pressure; and a pressure relief device in communication with the controller and operable to open the relief path connected to the supply path responsive to the pressure relief control command.

3. The energy regeneration system for machinery according to claim 1, wherein the pressure control of the discharge flow path and/or the supply flow path performed by the first and second regenerating fluid pressure motors is a relief control in which fluid in the discharge flow path and/or the supply flow path is to be relieved when the pressure of the discharge flow path and/or the supply flow path reaches a predetermined relief pressure.

4. The energy regeneration system for machinery according to claim 1, wherein the flow rate of supply fluid to the fluid pressure actuator is controlled by a supplying flow rate control valve; and the relief path being connected to the supply path between the supplying flow rate control valve and the fluid pressure actuator.

5. The energy regeneration system for machinery according to claim 1, wherein:

the fluid pressure actuator is a bi-directional rotary fluid pressure motor having two fluid ports; and each of the first and second regenerating fluid pressure motors is a displacement variable fluid pressure motor provided in a discharge flow path for fluid discharged from one of the fluid ports, respectively.

6. The energy regeneration system for machinery according to claim 5 wherein:

the relief flow path is adapted to function as a discharge flow path for fluid discharged from the one of the two fluid ports.

7. The energy regeneration system for machinery according to claim 6, wherein the machinery is equipped with a controller operable to receive an operation signal from a fluid pressure actuator operation tool, a detection signal from a pressure detection means for detecting the pressure of the discharge flow path and/or the supply flow path of the fluid pressure actuator, said controller further being operable to output a control command to a displacement control means for the first and second regenerating fluid pressure motor based on the operation and detection signals.

8. The energy regeneration system for machinery according to claim 5, wherein the energy regeneration device comprises:

a power generating means which generates electric power due to the rotational driving of the first and second regenerating fluid pressure motor;

a power storage means for storing electric power generated by the power generating means; and an inverter for converting electric power stored in the power storage means into AC power.

9. The energy regeneration system for machinery according to claim 1, wherein electrical energy obtained by the energy regeneration device is used as a power supply source for a motor for driving a pump adapted to supply pressurized fluid to the fluid pressure motor.

10. The energy regeneration system for machinery according to claim 9, wherein the motor is used as an auxiliary power source for the pump.

11. A machine comprising:

a hydraulic actuator having first and second supply/discharge ports;

a flow rate control circuit including first and second flow rate control lines connecting with said first and second supply/discharge ports, respectively;

at least one displacement variable hydraulic motor within said flow rate control circuit;

at least one pressure sensing means disposed within said flow rate control circuit between said at least one displacement variable hydraulic motor and said hydraulic actuator;

an energy regeneration device coupled with said displacement variable hydraulic motor for regenerating at least a portion of an energy of discharge fluid of said hydraulic actuator as electrical energy;

said first and second flow rate control lines each comprise a supply/discharge line connected with said first and second supply/discharge ports of said hydraulic actuator, respectively;

said at least one displacement variable hydraulic motor comprises a first and a second displacement variable hydraulic motor disposed one within each of said first and second supply/discharge lines.

12. The work machine of claim 11 wherein said hydraulic actuator is a bi-directional rotatable hydraulic motor.

13. The work machine of claim 12 wherein said at least one pressure sensing means comprises a first pressure sensor disposed within said first supply/discharge line and a second pressure sensor disposed within said second supply/discharge line.

14. The work machine of claim 13 further comprising:

a displacement control means coupled with each of said first and second displacement variable hydraulic motors;

an electronic controller operably coupled with each of said first and second pressure sensors and with each said displacement control means, said electronic controller configured to receive a pressure signal from one of said pressure sensors and responsively output a displacement control signal to the corresponding displacement variable hydraulic motor.

15. A method of operating a hydraulic system comprising the steps of:

supplying hydraulic fluid to a hydraulic actuator;

diverting a portion of fluid away from the hydraulic actuator into a relief path if a pressure of the supplying hydraulic fluid exceeds a predetermined relief pressure;

controlling at least one of flow rate and hydraulic Pressure in a discharge flow path of the hydraulic actuator at least in part by adjusting a displacement of a hydraulic energy regeneration motor in a hydraulic control circuit of the system; and recovering energy from fluid flowing in the relief path.

16. The method of claim 15 wherein the controlling step comprises adjusting the displacement of the motor responsively to a determined fluid pressure in the hydraulic control circuit in at least one of an upstream and a downstream position relative to the hydraulic actuator.

17. The method of claim 16 wherein the hydraulic actuator is a bi-directional hydraulic motor, the controlling step further comprising controlling rotational motion of the hydraulic actuator.

* * * * *

UNITED STATES PATENT AND TRADEMARK OFFICE

CERTIFICATE OF CORRECTION

PATENT NO. : 7,401,464 B2
APPLICATION NO. : 11/299392
DATED : July 22, 2008
INVENTOR(S) : Yoshino It is certified that error appears in the above-identified patent and that said Letters Patent is hereby corrected as shown below:

Please correct the Claim as follows:
Column 9, line 49, in claim 1, after "second" insert -- energy --.

Signed and Sealed this

Sixth Day of January, 2009

JON W. DUDAS
*Director of the United States Patent and Trademark Office*